United States Patent [19]
Armitage et al.

[11] Patent Number: 5,500,764
[45] Date of Patent: Mar. 19, 1996

[54] OPTICAL WAVEGUIDE AMPLIFIER

[75] Inventors: Jonathan R. Armitage, Ipswich; Richard Wyatt, Felixstowe; Jennifer F. Massicott, Ipswich, all of England

[73] Assignee: British Telecommunicaions Public Limited Company, London, England

[21] Appl. No.: 961,710

[22] PCT Filed: Jul. 18, 1991

[86] PCT No.: PCT/GB91/01193

§ 371 Date: Jan. 12, 1993

§ 102(e) Date: Jan. 12, 1993

[87] PCT Pub. No.: WO92/02061

PCT Pub. Date: Feb. 6, 1992

[30] Foreign Application Priority Data

Jul. 24, 1990 [GB] United Kingdom .................... 9016181

[51] Int. Cl.$^6$ ................................. H01S 3/06; H01S 3/30
[52] U.S. Cl. ........................ 359/341; 359/160; 372/40; 372/75
[58] Field of Search ...................... 359/341, 160; 372/40, 75

[56] References Cited

U.S. PATENT DOCUMENTS 5,005,175  4/1991  Desurvire et al. .................. 372/40

(List continued on next page.)

OTHER PUBLICATIONS

*Electronics Letters*, vol. 26, No. 20, 27 Sep. 1990, ENAGE GB, pp. 1645–1646; Massicot et al: "High Gain, Broadband, 1.6 μm Er3+doped Silica Fibre Amplifier".

*IEEE Photonics Technology Letters*, vol. 1, No. 9, Sep. 1989, New York US, pp. 267–269; Becker et al; "High–Gain and High–Efficiency Diode Laser Pumped Fiber Amplifier at 1.56 μm".

*Electronics Letters*, vol. 25, No. 14, 6 Jul. 1989, ENAGE GB, pp. 910–911; Atkins et al: "High–Gain, Broad Spectral Bandwidth Eribum–Doped Fibre Amplifier Pumped Near 1.5 μm".

*Electronics Letters*, vol. 26, No. 14, 5 Jul. 1990, ENAGE GB, pp. 1038–1039 Massocot et al: "Efficient, High Power, High Gain, Er3+Doped Silica Fibre Amplifier".

*Journal of Applied Physics*, vol. 64, No. 2, 15 Jul. 1988, New York US, pp, 516–520; Kimura et al: "Lasing Characteristics of Er3+Doped Silica Fibers From 1553 Up to 1603 nm".

*IEEE Journal of Quantum Electronics*, vol. 26, No. 3, 3 Mar. 1990, New York US, pp. 423–425; Armitage et al: "Spectral Dependence of the Small–Signal Around 1.5 μm in Erbium Doped Silica Fiber Amplifiers".

*IEEE Photonics Technology Letters*, 1 (1989) Oct. No. 10, New York, US, Desurvire: "Analysis of Erbium–Doped Fiber Amplifiers Pumped in the $I_{15/r}$–$I_{13/2}$Band".

(List continued on next page.)

*Primary Examiner*—Nelson Moskowitz
*Attorney, Agent, or Firm*—Nixon & Vanderhye

[57] ABSTRACT

An optical fibre amplifier (50) comprises a $SiO_2$—$Al_2O_3$—$GeO_2$ single-mode optical fibre (52) doped with $E_r^{3+}$. It is pumped by 1.55 μm and 1.47 μm optical sources (54 and 56) whose optical outputs are combined by an optical coupler (58) and are then coupled to the fibre (52) by a further optical coupler (50). A source of optical signals to be amplified (62) is also coupled to the fibre (52) by the further coupler (60). The $E_r^{3+}$ ions provide a three-level lasing scheme with a fluorescence peak at about 1.53 μm. Low noise amplification of optical signals in the long-wavelength tail of the fluorescence spectrum with suppressed ASE at the fluorescence spectrums peak wavelength is obtained as follows. The 1.47 μm pump provides some low noise amplification of the optical signal but preferentially amplifies the 1.55 μm pump source. The resultant 1.55 μm amplified pump signal then provides pump power to amplify the optical signal whilst suppressing ASE as it has a longer wavelength than the fluorescence peak wavelength.

12 Claims, 4 Drawing Sheets

U.S. PATENT DOCUMENTS

| | | | |
|---|---|---|---|
| 5,042,039 | 8/1991 | Edagawa et al. | 372/70 |
| 5,157,683 | 10/1992 | Millar et al. | 372/70 |
| 5,177,562 | 1/1993 | Wysocki et al. | 359/341 |
| 5,224,116 | 6/1993 | Whitley et al. | 359/341 |
| 5,225,925 | 7/1993 | Gruff et al. | 359/341 |

OTHER PUBLICATIONS

*IEEE Photonics Technology Letters*, 1 (1989) Sep. No. 9, New York, Becker et al: "high–Gain and High–Efficiency Diode Laser Pumped Fiber Amplifier at 1.56 μm", pp. 267–269.

*J. Appl. Phys., 15, Jul. 1988* $_3$ vol. 64, No. 2, pp. 516–520, "Living Characteristics of Er+–Doped Silica Fibers From 1553 up to 1603 nm".

*IEEE Journal of quantum Electronics*, vol. 26, No. 3, Mar. 1990, Armitage: "Spectral Dependence of the Small–Signal Gain Around 1.5 A)M IN Eribum Doped Silica Fiber Amplifiers".

*IEEE Photonics Technology Letters*, vol. 1, No. 10, Oct. 1989, Desurvire: "Analysis of Erbium–Doped Fiber Amplifiers Pumped in the $^4I_{15/2}$–$^4I_{13/2}$ Band", pp. 293–296.

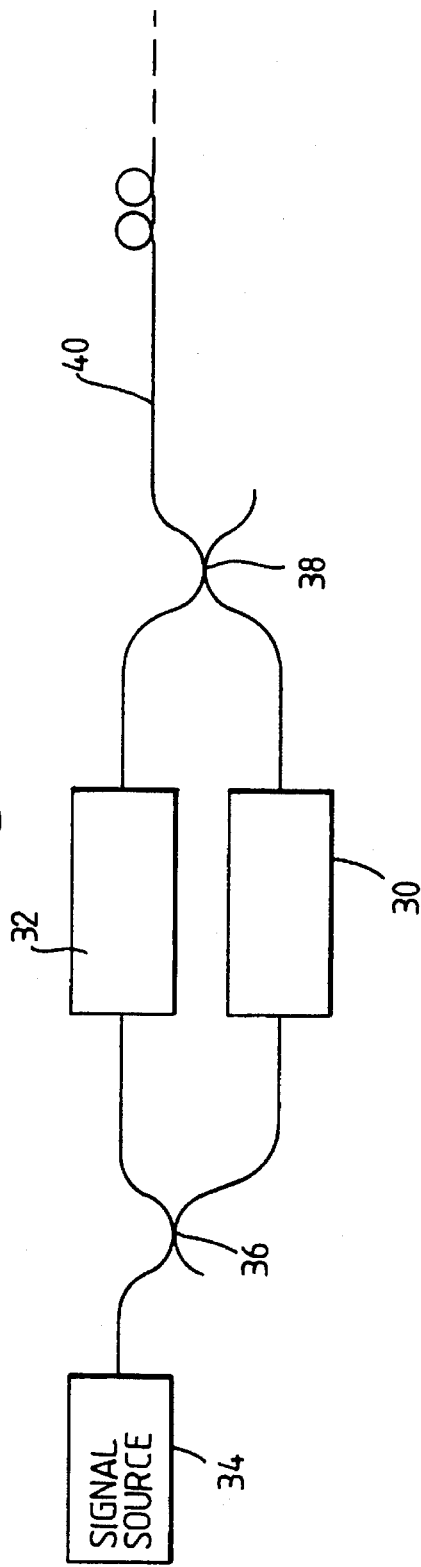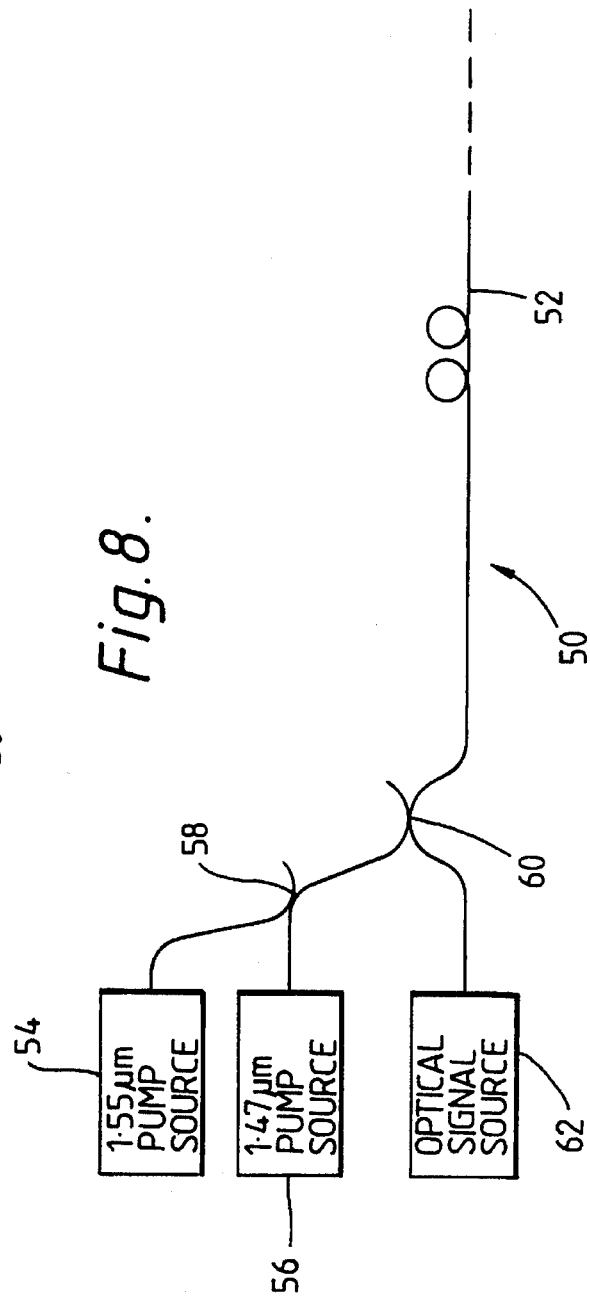

OPTICAL WAVEGUIDE AMPLIFIER

BACKGROUND

I. FIELD OF THE INVENTION

This invention relates to optical waveguide amplifiers and in particular to those comprising an optical waveguide doped with an active species providing a three-level laser scheme associated with a primary fluorescence peak at a first wavelength.

II. RELATED ART AND OTHER CONSIDERATION

In this specification the term "optical" is intended to refer to that part of the electromagnetic spectrum which is generally known as the visible region together with those parts of the infra-red and ultraviolet regions at each end of the visible region which are capable of being transmitted by dielectric optical waveguides such as optical fibres.

A three-level laser scheme comprises a lower lasting level or band of levels (LLL), that is the ground state or an energy level so close to it that it has a significant thermal population, or band of such levels, an upper lasting level or band of levels (ULL) and one or more pump bands of higher energy than the bottom of the ULL. In such a scheme, absorption from the LLL band to the ULL band can take place in direct competition with the stimulated emission of photons obtained by transitions in the reverse direction.

Pumping such an amplifier with an optical pump of wavelength shorter than the fluorescence peak associated with the lasting transition and corresponding to a pump band will produce, in well known fashion, a depopulation of the LLL and an increase in population of the ULL. The fractional population of the ULL is dependent on the pump power and the relative gain coefficient of the amplifier for a given signal wavelength is proportional to $N_2\sigma_2(\lambda)-N_1\sigma_1(\lambda)$ where $N_1$ and $N_2$ are the fractional population densities of the LLL and ULL respectively and $\sigma_1$ and $\sigma_2$ are the absorption and emission cross-sections.

Three-level laser scheme waveguide amplifiers can provide gain to signals at a wavelength in the long-wavelength tail of the fluorescence spectrum but there are problems connected with amplified spontaneous emission (ASE) at the gain-peak wavelength.

SUMMARY

According to the present invention an optical waveguide amplifier comprises an optical waveguide doped with an active species providing a three-level laser transition associated with a primary fluorescence peak at a first wavelength characterised in that the waveguide is coupled to at least a first optical pump source for providing optical pump power at a second wavelength which is longer than the first wavelength.

Pumping the amplifier at a wavelength longer than the wavelength of the primary fluorescence peak eliminates gain and therefore ASE, at this wavelength.

The invention is expected to find particular application in providing amplification of optical signals transmitted through optical fibre communications networks. A convenient class of waveguide amplifier for use with such silica-based optical fibre networks is the optical fibre doped with a rare-earth ion as it is readily incorporated in such a network. For example, a $SiO_2$—$Al_2O_3$—$GeO_2$ optical fibre doped with $Er^{3+}$ ions can provide gain in the 1.55 µm telecommunications window. Such an optical amplifier has been found to provide useful gain around 1.60 µm for a pump wavelength of 1.55 µm achieving a maximum useful spectral bandwidth of 1.57 µm to 1.61 µm.

The present invention is not restricted in its application to this specific silica-based $Er^{3+}$ doped lasing scheme. Other doped waveguides exhibiting three-level lasing schemes may be employed, for example planar silica or lithium niobate waveguides doped with a suitable dopant. Similarly other optical fibre hosts, such as fluoride fibres, or other appropriate dopants, for example ytterbium may be used with the pumping scheme of the present invention.

Preferably the amplifier includes a second optical pump source for providing optical pump power at a wavelength shorter than the first wavelength.

As will be explained in more detail below this provides superior noise performance while maintaining the ability to suppress ASE build-up at the fluorescence peak wavelength. For such a silica based $Er^{3+}$ doped, optical fibre amplifier, the second optical pump source is preferably a semiconductor laser providing pump power at about 1.47 µm.

An optical waveguide amplifier according to the present invention may comprise a first optical waveguide amplifier comprising an optical waveguide doped with an active species providing a three-level laser scheme associated with a primary fluorescence peak at a first wavelength coupled to a first optical pump source for providing optical pump power at a second wavelength which is longer than the first wavelength and a second optical waveguide amplifier comprising a waveguide doped with the same active species as the first optical waveguide amplifier and including a third optical pump source for providing optical pump power at a wavelength which is shorter than the first wavelength, an optical coupling means for coupling portions of an optical signal to a respective one of the first and second optical waveguide amplifiers, and an optical combining means for combining the portions of the optical signal after propagation along the first and second optical waveguide amplifiers.

Such an amplifier provides a composite amplifier having a broader bandwidth than a single fibre amplifier doped with the active species.

According to a further aspect of the present invention an optical transmission system comprises an optical waveguide amplifier according to present invention to which is coupled a source of optical signals at a wavelength longer than the second wavelength.

According to a yet further aspect of the present invention a method of amplifying optical signals comprises coupling the optical signals to an optical waveguide amplifier according to the present invention whilst providing pump power from each optical pump source, the optical signals having a wavelength longer than the second wavelength.

BRIEF DESCRIPTION OF THE DRAWINGS

The present invention and its operation will now be described, by way of example only, with reference to the accompanying drawings of which:

FIG. 7 is a schematic diagram of a further embodiment of the present invention;

FIG. 8 is a schematic diagram of a further embodiment of the present invention using two optical pumps.

DETAILED DESCRIPTION OF THE DRAWINGS

Figure 1:
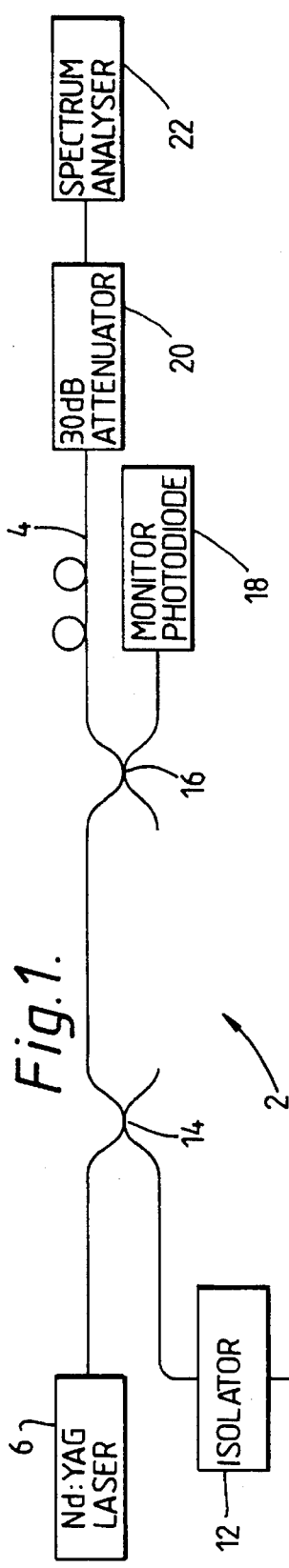
FIG. 1 is a schematic diagram of an optical $Er^{3+}$-doped fibre amplifier according to the present invention configured to permit its amplifying behaviour to be studied.
Figure 2:
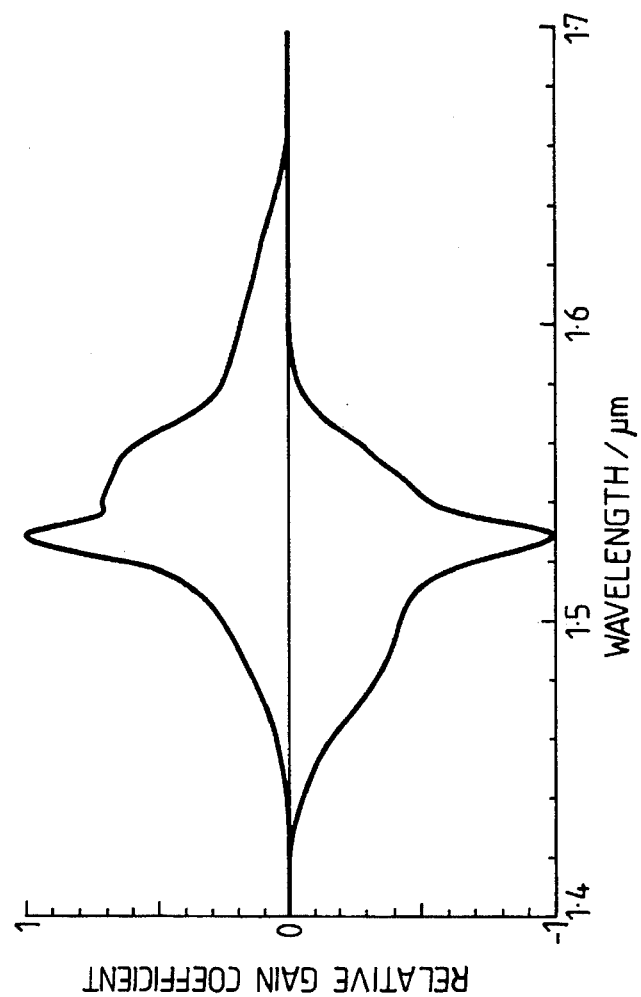
FIG. 2 is a graph of the relative absorption and emission cross-sections for the doped fibre of FIG. 1.

Referring to FIG. 1, an optical waveguide amplifier 2 includes a $SiO_2$—$Al_2O_3$—$GeO_2$ optical fibre 4 having a core diameter of 5.5 μm and Δn of 0.015 doped with $Er^{3+}$ ions to a level corresponding to an absorption of 5.5 dB/m at the 1.53 μm absorption peak (see FIG. 2). It had a background loss measured at 1.1 μm of less than 0.01 dB/m.

FIG. 2 shows the relative absorption and emission cross-sections as a function of wavelength for zero inversion (i.e. unpumped fibre) and full inversion of the three-level laser transition scheme associated with the 1.53 μm fluorescence peak.

Figure 3:
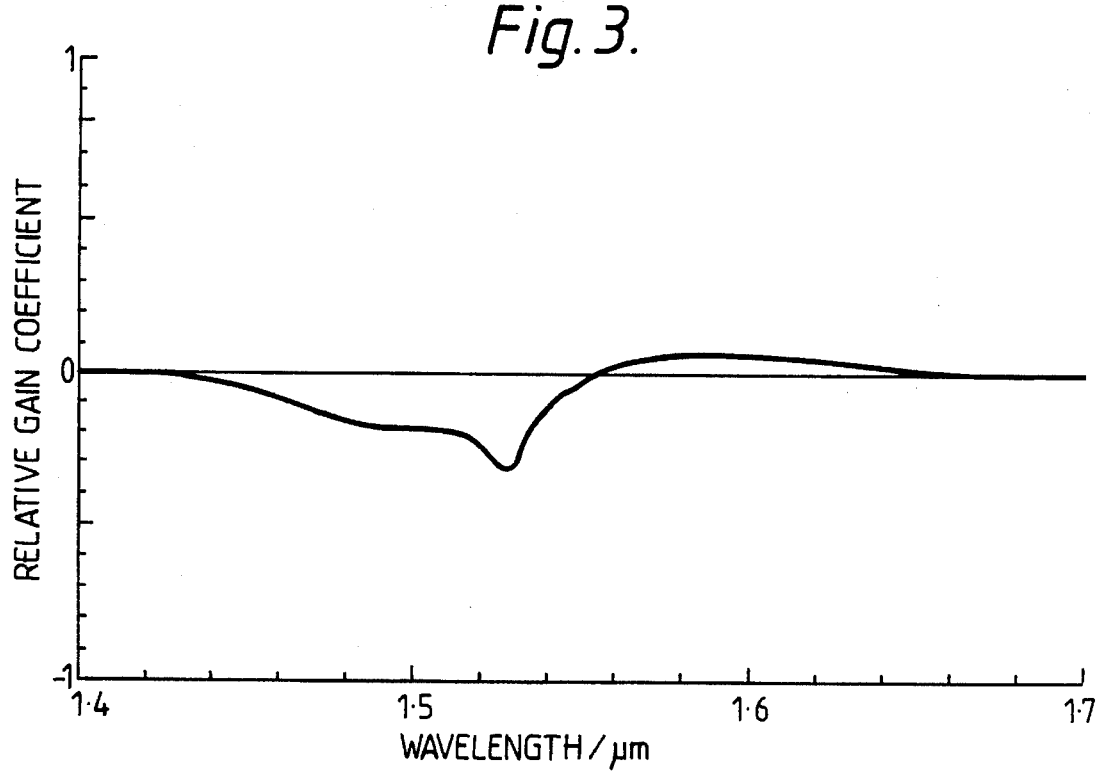
FIG. 3 is a graph of the relative gain spectrum of the doped fibre of FIG. 1 for a fractional inversion of 0.35.

As discussed in an article entitled "High-gain, broad spectral bandwidth erbium-doped fibre amplifier pumped near 1.5 μm" by C. G. Atkins, J. F. Massicott, J. R. Armitage, R. Wyatt, B. J. Ainslie and S. P. Craig-Ryan, Electronics Letters 6th Jul. 1989 Vol 25 No. 14 pp 910–911, the maximum population inversion for intense pumping at any wavelength can be calculated from the absorption and emission cross-sections assuming equal absorption and emission rates at the pump wavelength. Incomplete inversion affects both the peak value of the gain obtainable for any given fibre length and also the shape of the gain spectrum. The result for a fractional inversion of 0.35 is shown in FIG. 3.

The invention in its broadest aspect is based on the appreciation by the applicants that operation of the fibre amplifier at a suitably low fractional population inversion will provide gain at wavelengths in the long-wavelength tail of the fluorescence spectrum of the laser transition whilst suppressing gain at the peak wavelength and, in particular, this can be achieved by pumping the waveguide at a second wavelength longer than the fluorescence peak wavelength. The actual fractional population to avoid ASE depends on the particular waveguide and dopant.

Referring again to FIG. 1, a stabilised Nd:YAG pumped colour centre laser 6 operating with a NaCl:OH crystal and tunable from <1.45 μm to >1.65 μm provides the optical pump power to pump the doped fibre waveguide 4. An external cavity semiconductor laser 8 tunable from 1.56 μm to 1.65 μm is used to provide signals to be amplified, which signals (probe signals) are passed through a precision optical attenuator 10 followed by a polarisation insensitive optical isolator 12 both fibre-coupled and connected by splicing. The pump and probe signals are combined by a dichroic fibre coupler 14 through which maximum pump transmission occurred at 1.55 μm and maximum signal transmission at 1.6 μm. The combined pump and probe signals are coupled to the doped fibre 4 by a precalibrated 1% coupler tap 16 that allows monitoring of the pump and probe power levels at the input of the fibre 4 by a monitor photodiode 18.

The output signal from the fibre 4 was passed through a fixed fibre attenuator 20 of 30 dB and measured on an optical spectrum analyser 22.

Preliminary optimisation of the pump wavelength between 1.54 μm and 1.57 μm revealed 1.55 μm as the best compromise achieving maximum spectral bandwidth of 1.57 μm to 1.61 μm. This was used for all the following measurements. For the measurements requiring a fixed probe wavelength, 1.6 μm was chosen. The maximum pump and signal powers launched into the fibre 4 were 160 mW and 0.1 mW (−10 dBm), respectively. The residual pump power was always less than 10 mW.

Figure 4:
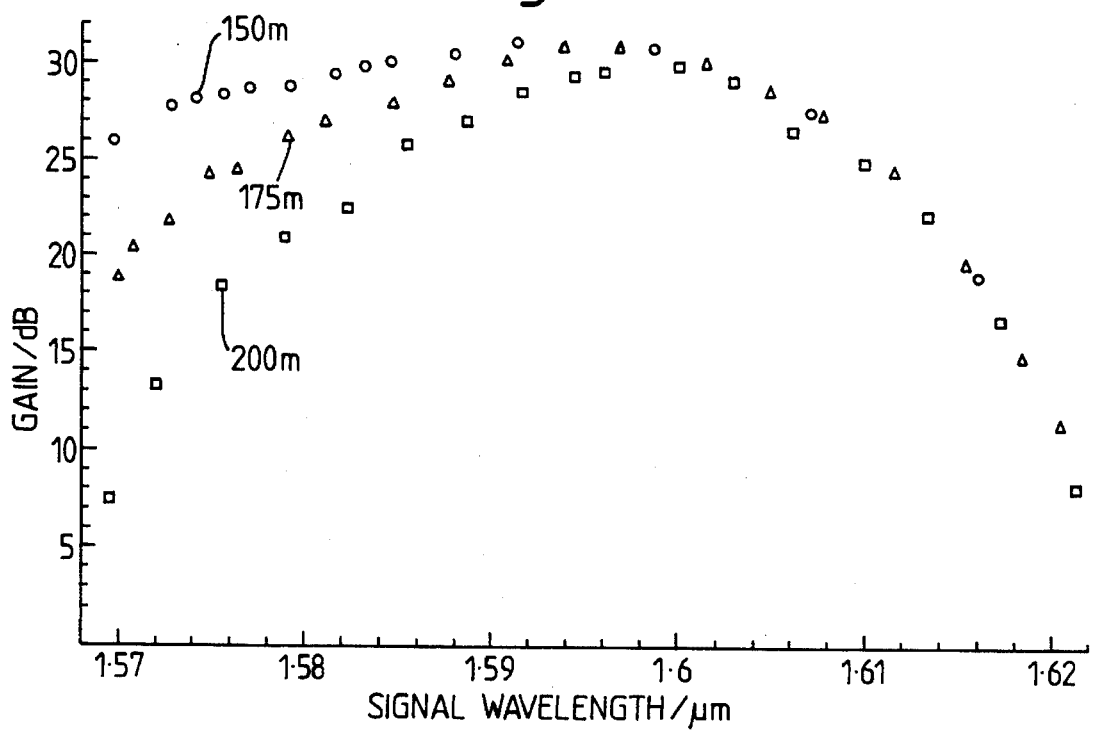
FIG. 4 is a graph of the small signal gain spectra for various lengths of doped-fibre in the embodiment of FIG. 1.

FIG. 4 shows the small signal gain spectra obtained for 150 m, 175 m and 200 m of fibre pumped with 140 mW. The input signal level was held constant at −28 dBm. For 150 m of fibre 4 a broadband gain response in excess of 25 dB was measured between 1.57 μm and 1.61 μm, with a maximum value of 31 dB. The shift in the gain spectra to shorter wavelengths as the fibre is cut back is consistent with a higher net fractional inversion in the fibre. However, a much sharper than expected and length-independent cut-off in the gain in 1.61 μm is seen which is consistent with excited state absorption measurements.

Figure 5:
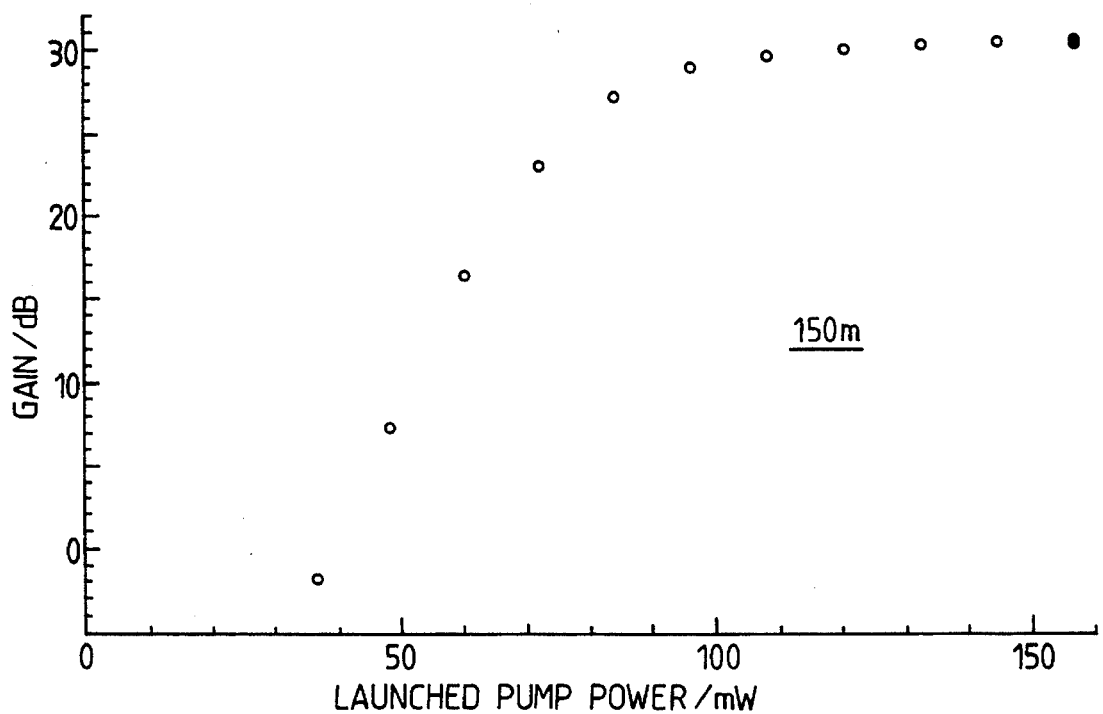
FIG. 5 is a graph showing the pump power dependence of the small signal gain for a 150 m length of doped fibre in the embodiment of FIG. 1.

FIG. 5 shows the pump power dependence of the small signal gain in the 150 m length of fibre 4. The curve departs from linearity for launched pump powers greater than 80 mW. This is probably the result of gain saturation due to amplified spontaneous emission. At this optimum point 0.33 dB of gain per mW of pump is available.

Figure 6:
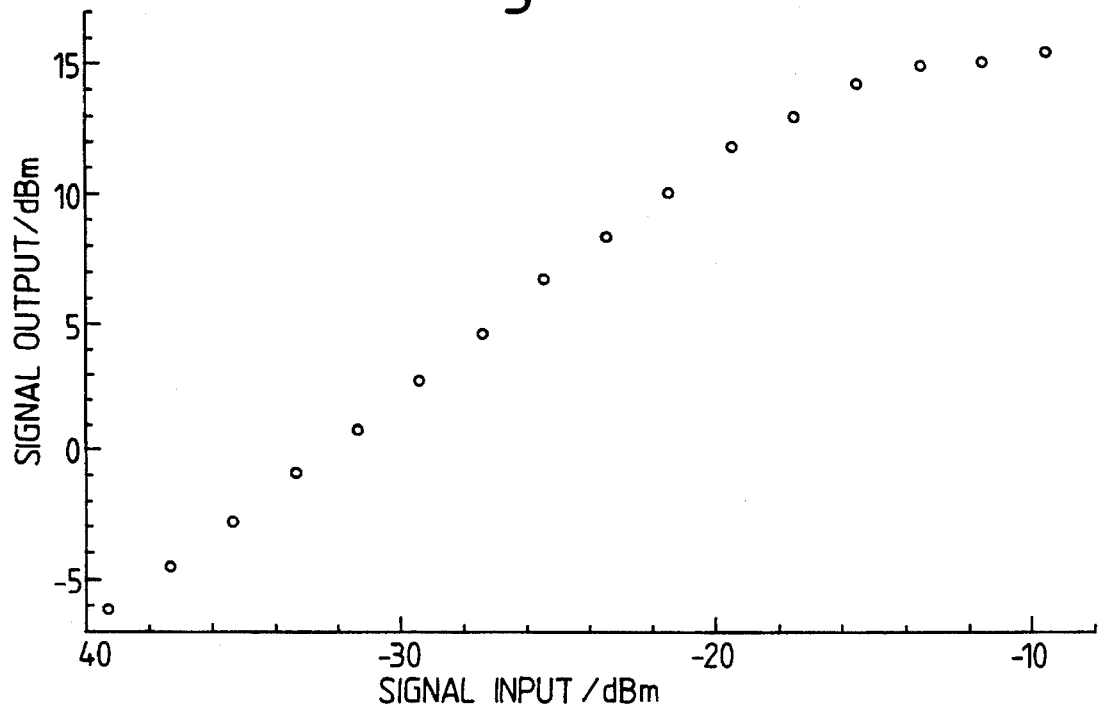
FIG. 6 is a graph of the signal output power against signal input power for a 150 m length of doped fibre in the embodiment of FIG. 1.

Signal output against input power for 140 mW of pump power is shown in FIG. 6. Saturation of the gain begins to occur at signal input levels of −18 dBm. For the maximum signal launched the gain was 25 dB and for an increased pump power of 160 mW, an output signal of 45 mW was obtained.

The above demonstrates the use of $Er^{3+}$ doped silica fibre as a 1.6 μm broadband amplifier, obtaining in excess of 25 dB of small signal gain between 1.57 μm and 1.61 μm by pumping at 1.55 μm. An optimum small signal gain of 0.33 dB/mW and a saturated output of 45 mW for 160 mW of pump power have been achieved.

Referring now to FIG. 7 an optical fibre amplifier comprises an $Er^{3+}$ doped silica-based optical fibre amplifier 30 optimised for amplification at 1.55 μm in known manner in parallel with an $Er^{3+}$ doped silica-based optical fibre amplifier 32 pumped by an optical pump source at 1.55 μm, as in the embodiment of FIG. 1. A source of optical signals 34 is coupled to the amplifiers 30 and 32 by means of an optical fibre coupler 36. The portions of the signals amplified by the respective amplifiers 30 and 32 are combined by the optical coupler 38 for onward transmission along fibre 40 spliced to the coupler 38. The arrangement of FIG. 7 can provide a bandwidth of about 70 nm making it suitable for amplification in wavelength division multiplexed systems.

Such amplifiers may not, in general have an optimum noise performance. The noise figure for a three level laser transition scheme which is pumped directly into the metastable upper lasing level depends on the pump wavelength. A minimum value is obtained for high pump powers in which case $$F_{min} = 2/(1 - (R_{pump}/R_{signal}))$$

where $R_{pump}$ and $R_{signal}$ are the ratios of emission to absorption cross-sections at the pump and signal wavelengths, respectively.

The R value for 1.47 µm is typically 0.34, for 1.55 µm, typically 1.7, and for 1.58 µm, typically 3 for a SiO$_2$—Al$_2$O$_3$—GeO$_2$ fibre 4 of FIG. 1. Using the noise figure equation for a 1.47 µm-pumped amplifier amplifying signals at 1.55 µm, one obtains a theoretical minimum noise figure of 3.9 dB, while if one takes the case of a 1.55 µm-pumped amplifier amplifying at 1.58 µm, one obtains a value of 6.6 dB, so this case is clearly worse. This is due to the much closer proximity of the pump wavelength to the signal wavelength. This proximity is necessary according to the teaching of the present invention to obtain a suitably tailored gain spectrum, while at the same time suppressing lasing and ASE nearer the gain peak. A 1.47 µm-pumped, 1.58 µm amplifier would be capable of a noise figure of 3.3 dB if a way could be found to suppress the effects of ASE at the gain peak.

A way to obtain the benefit of shorter pumping wavelengths with their superior noise performance while maintaining the ability to suppress ASE build-up at the gain peak is to utilise two pump wavelengths. The first pump, at 1.47 µm say, is a strong pump, and provides a few dB of low noise gain for the 1.58 µm signal. The second pump is near 1.55 µm and has a power of 0.1 mW–1 mW at the fibre input. The 1.47 µm pump, at a wavelength less than the fluorescence peak of the three level laser scheme, acts as a pump for this 1.55 µm second pump for which the fibre has higher gain than for the 1.58 µm signal. Hence, after some distance down the fibre, the amplified 1.55 µm secondary pump will deplete the power from the primary pump, and hence prevent the further build up of ASE at the gain peak. Transfer of power to the secondary pump will be very efficient and the amplified 1.55 µm will now act as a new primary pump for the 1.58 µm signal See "Efficient, high power, high gain, erbium doped silica fibre amplifier", J. S. Massicott, R. Wyatt, B. J. Ainslie, S. P. Craig-Ryan, Electronics Letters Vol 26 No. 14 pp1038–9. Because this signal is now at a higher level, the noise penalty from the close pump wavelength is less significant. This pumping scheme effectively utilises the front end of the fibre, which is pumped at 1.47 µm, as a built-in, low noise preamplifier. In this way one can obtain the combined benefits of low noise, and high gain.

An embodiment of the present invention utilising this dual pumping scheme is shown in FIG. 8 in which an SiO$_2$—Al$_2$O$_3$—GeO$_2$, Er$^{3+}$ doped, optical fibre 52 is pumped by both 1.55 µm and 1.47 µm sources 54 and 56 whose outputs are combined by an optical fibre coupler 58. The combined output and an optical signal source 62 are coupled to the fibre by a further optical fibre coupler 60. Dielectric, dichroic beam combiners may be used instead of the couplers 58 and 60 to obtain a flatter pass band but at the possible expense of increased insertion loss.

We claim:

1. An optical waveguide amplifier comprising:
   an optical waveguide doped with an active species providing a three level laser transition, which transition exhibits a primary fluorescence peak at a first wavelength;
   input means for coupling input optical signals to be amplified to the optical waveguide;
   output means for signals amplified in the waveguide; and
   a pump source coupled to the waveguide, the pump source providing optical pump power at a second wavelength which is longer than the first wavelength, whereby to produce amplification of the input signals in the waveguide.

2. An amplifier as claimed in claim 1 in which the waveguide comprises a silica-based optical fibre doped with a rare-earth ion.

3. An amplifier as claimed in claim 2 in which the waveguide comprises a SiO$_2$—Al$_2$O$_3$—GeO$_2$ optical fibre doped and the active species is Er$^{3+}$.

4. An amplifier as claimed in claim 1 wherein said first wavelength is 1.53 µm.

5. An optical waveguide amplifier comprising an optical waveguide doped with an active species providing a three-level laser transition, which transition exhibits a primary fluorescence peak at a first wavelength, the amplifier characterized in that the waveguide is coupled to at least a first optical pump source for providing optical pump power at a second wavelength which is longer than the first wavelength, the waveguide comprising a SiO$_2$—Al$_2$O$_3$—GeO$_2$ optical fibre doped and the active species is Er$^{3+}$, in which the second wavelength is between 1.54 µm and 1.57 µm.

6. An amplifier as claimed in claim 5 in which the second wavelength is 1.55 µm.

7. An optical waveguide amplifier comprising an optical waveguide doped with an active species providing a three-level laser transition, which transition exhibits a primary fluorescence peak at a first wavelength, the amplifier characterized in that the waveguide is coupled to at least a first optical pump source for providing optical pump power at a second wavelength which is longer than the first wavelength, and further comprising a second optical pump source for providing optical pump power at a third wavelength which is shorter than the first wavelength.

8. An amplifier as claimed in claim 7 in which the second optical pump source is a semi-conductor laser providing pump power at about 1.47 µm.

9. An optical waveguide amplifier comprising:
   a first optical waveguide amplifier, the first optical waveguide amplifier comprising an optical waveguide doped with an active species providing a three-level laser transition, which transition exhibits a primary fluorescence peak at a first wavelength, the amplifier characterized in that the waveguide is coupled to at least a first optical pump source for providing optical pump power at a second wavelength which is longer than the first wavelength;
   a second optical waveguide amplifier comprising a waveguide doped with the same active species as the first optical waveguide amplifier and optimized for amplification at the same wavelength as the second wavelength of the first optical waveguide amplifier;
   an optical coupling means for coupling portions of an optical signal to the first and second optical waveguide amplifiers; and
   an optical combining means for combining the portions of the optical signal after propagation along the first and second optical waveguide amplifiers.

10. An optical waveguide amplifier as claimed in claim 8 as claim 1 in which the optical coupling means and optical combining means comprise optical fibre couplers.

11. An optical transmission system comprising:
    an optical waveguide amplifier, the optical waveguide amplifier comprising an optical waveguide doped with an active species providing a three-level laser transition, which transition exhibits a primary fluorescence peak at a first wavelength, the amplifier characterized in that the waveguide is coupled to at least a first optical pump source for providing optical pump power at a second wavelength which is longer than the first wavelength;

a source of optical signals at a wavelength which is longer than the second wavelength, the source of optical signals being coupled to the optical waveguide amplifier.

12. A method of amplifying optical signals using an optical waveguide doped with an active species providing a three-level laser transition, which transition exhibits a primary fluorescence peak at a first wavelength, the method comprising:

pumping the waveguide using an optical pump source for providing optical pump power at a second wavelength which is longer than the first wavelength; and coupling optical signals to the optical waveguide while providing pump power from the optical pump source, the optical signals having a wavelength which is longer than the second wavelength.

* * * * *